United States Patent Office 3,379,710
Patented Apr. 23, 1968

3,379,710
PROCESS OF PREPARING A NITRO-NITROSO DIMER FROM AN OLEFINIC HYDROCARBON AND A MIXTURE OF NO AND $NO_2$
Alan F. Ellis, Murrysville, Pa., assignor to Gulf Research & Development Company, Pittsburgh, Pa., a corporation of Delaware
No Drawing. Continuation-in-part of application Ser. No. 517,790, Dec. 30, 1965. This application Nov. 29, 1966, Ser. No. 597,512
14 Claims. (Cl. 260—143)

ABSTRACT OF THE DISCLOSURE

A process is defined for the product of a nitro-nitroso dimer by the reaction of a monoolefin or a non-conjugated diolefin with a mixture of NO and $NO_2$ wherein the molar ratio of NO to $NO_2$ is at least 1:1. The temperature and pressure of reaction are such that the $NO_2$ is substantially entirely in the vapor phase and the stoichiometric ratio of the mixture of NO and $NO_2$ to the olefin is less than 0.5.

---

This invention relates to the preparation of nitro-nitroso dimers by the reaction of selected olefinic hydrocarbons with a nitrosating agent.

This application is a continuation-in-part of my prior co-pending application, Ser. No. 517,790, filed Dec. 30, 1965, now abandoned, and assigned to the same assignee as the present application.

It has been found that certain olefinic hydrocarbons will react with a gaseous mixture of NO and $NO_2$ to result in the preparation of nitro-nitroso addition compounds. The nitro-nitroso addition compounds form solid dimers under the proper conditions. The nitro-nitroso dimers can be converted thermally, preferably in the presence of acetic anhydride, to nitroolefins which can be converted by hydrogenation in the normal manner to useful alkyl amines. Due to the usefulness of these nitro-nitroso dimers, it is desirable to obtain these dimers in as high a yield as possible from the reaction of selected olefins with a nitrosating agent consisting of a mixture of NO and $NO_2$ wherein the molar ratio of NO to $NO_2$ is at least 1:1. It has now been found that the nitro-nitroso dimers can be made in high yields by careful control of reaction conditions and by limiting the stoichiometric ratio of the nitrosating agent to the olefinic hydrocarbon in the reaction zone.

In accordance with the invention, high yields of nitro-nitroso dimers are produced by a process which comprises reacting a charge stock comprising an olefinic hydrocarbon selected from the group consisting of a monoolefinic hydrocarbon and a non-conjugated diolefinic hydrocarbon with a nitrosating agent consisting of a mixture of NO and $NO_2$ wherein the molar ratio of NO to $NO_2$ is at least 1:1 under conditions of temperature and pressure such that the $NO_2$ is substantially entirely in the vapor phase and wherein the stoichiometric ratio of the nitrosating agent to the olefinic hydrocarbon is less than 0.5.

The charge stock for this reaction comprises any olefinic hydrocarbon selected from the group consisting of a monoolefinic hydrocarbon and a non-conjugated diolefinic hydrocarbon. The charge stock suitably can contain between 2 and 25 carbon atoms when the olefinic hydrocarbon is a monoolefin. When the olefinic hydrocarbon is a non-conjugated diolefin, the charge stock can suitably contain between 5 and 25 carbon atoms. Mixtures of monoolefins and non-conjugated diolefins can also be employed. By a conjugated diolefinic hydrocarbon is meant any diolefinic hydrocarbon where the olefinic double bonds are in an alpha-gamma relationship, for example, 1,3-butadiene. Conversely, a non-conjugated diolefin is an olefinic hydrocarbon containing two olefinic double bonds which are not in an alpha-gamma relationship to each other.

The preferred olefins are the monoolefins and the more preferred olefins are the aliphatic and alicyclic monoolefins which have no branching on the alpha or beta carbon atoms. The preferred olefinic hydrocarbons are the alpha olefins having the formula:

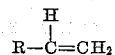

where R can be hydrogen or any aliphatic hydrocarbon. The olefinic hydrocarbon charge stock can suitably have between 2 and 25 carbon atoms per molecule, and preferably has between 4 and 16 carbon atoms per molecule. The charge stock can be a single olefin or a mixture of olefins, such as is obtained by the cracking of wax or by the telomerization of ethylene. The charge stock can also suitably contain diluent materials which either do not react with the nitrosating agent or which react so much more slowly than the olefinic hydrocarbon that for all practical purposes they can be considered inert. Suitable diluent materials include, for example, paraffins, aromatics and naphthenes. It is preferred that highly polar organic materials be avoided as diluents, since the highly polar organic diluent materials tend to dissolve the desired nitro-nitroso dimers.

Examples of suitable olefinic hydrocarbon charge stocks include but are not limited to: ethylene; propylene; 1-butene; 2-butene; isobutylene; 1-pentene; 2-pentene; 1,4-pentadiene; 1-hexene; 2-hexene; 1,5-hexadiene; cyclohexene; 4-methyl-1-pentene; 1-heptene; 3-ethyl-1-pentene; 1-octene; 1,7-octadiene; 3-octene; styrene; 1-decene; 3,7-dimethyl-1-octene; 1-undecene; 1-dodecene; 1,11-dodecadiene; 2-cyclohexyl-1-hexene; 1-tetradecene; 1-hexadecene; 1-eicosene; and 1-tetracosene.

The nitrosating agent which is useful in the preparation of the nitro-nitroso dimers of this invention consists of a gaseous mixture of NO and $NO_2$ wherein the molar ratio of NO to $NO_2$ is at least 1:1. Pure NO is not suitable in this reaction, but NO with small amounts of $NO_2$ will serve to prepare the dimers of this invention, since NO in the presence of $NO_2$ and the nitro-nitroso monomer will generate additional $NO_2$ radicals for use in the reaction. Pure $NO_2$ is unsuitable for use in this reaction, and the use of mixtures of NO and $NO_2$ wherein the molar ratio of $NO_2$ to NO is greater than 1:1 is undesirable since unwanted by-products including dinitro and nitrated olefins will result. Likewise, the use of $N_2O_4$ is not suitable as a nitrosating agent in the process of this invention. Nitrogen trioxide ($N_2O_3$) is suitable for use in the process of this invention as it dissociates into a 1:1 molar mixture of NO and $NO_2$.

It has been found that in order to obtain high yields of the desired nitro-nitroso dimers, the stoichiometric ratio of the nitrosating agent to the olefinic hydrocarbon must be maintained below 0.5, preferably below 0.35. The most preferred stoichiometric ratio is between 0.1 and 0.35. As the stoichiometric ratio of the nitrosating agent to olefin goes above 0.5, the yield of the desired dimer falls off drastically. While it is not certain, it is believed that, as the stoichiometric ratio of nitrosating agent to olefin increases, some by-products form which are highly polar, and above a stoichiometric ratio of 0.5 there is enough by-product to effect solubilization of the dimer which then tends to form the monomer which, in turn, tends to decompose and form more undesired by-products. This effect spirals quickly and the yield of dimer decreases rapidly and suddenly.

The nitro-nitroso monomers which are formed by the process of this invention have the nitro ($-NO_2$) and nitroso (—N=O) groups on adjacent carbon atoms. These monomers dimerize through the nitroso group. The nitro-nitroso monomers form colored greenish liquids while the dimers are white crystalline solids. It has been found that when an alpha-olefin is employed as the charge stock, and the beta carbon atom has at least one hydrogen atom, the nitro-nitroso monomers are always the 1-nitro-2-nitroso, whereas with internal olefins, the distribution of nitro and nitroso groups is random. It has been found that when the diolefins, such as 1,5-hexadiene, are employed as the charge stock, the $N_2O_3$ adds unexpectedly to primarily only one of the olefinic bonds to the substantial exclusion of the other.

It is also important to maintain conditions of temperature and pressure in the reaction zone such that the $NO_2$ is substantially entirely in the vapor phase and also to maintain conditions of temperature and pressure in the reaction zone so that the nitro-nitroso dimer at least partially precipitates during reaction. In general, the reaction can be carried out at a temperature between about 0° and the melting point of the dimer, which in most cases is between about 55° and 100° C. Temperatures below 0° C. are not preferred since it becomes more difficult to maintain the $NO_2$ in the gaseous phase. Temperatures between 10° and 60° C. are preferred with the most preferred temperatures being between 20° and 50° C. The higher temperatures favor solution of the dimer in the solvent and dissociation of dissolved dimer into monomer which, in turn, decomposes to unwanted side products. The melting point of the dimer represents the upper limit of reaction temperature since if it is not possible for the dimer to at least partially precipitate during reaction, it tends to decompose more rapidly into other undesirable nitrated products. It is preferred that most of the dimer precipitate during reaction because when the dimer is dissolved in the reaction medium, it tends to form the nitro-nitroso monomer which is very unstable and it in turn tends to form unwanted by-products, such as dinitro compounds, nitronitrites, nitroolefins, etc. The precipitated dimer does, however, present slurry problems and care must be taken to have a sufficient amount of solvent in the form of excess olefin, paraffin, aromatic, etc. present to allow the slurry to be pumped.

The reaction pressure will depend somewhat on the exact nature of the nitrosating agent employed. If $N_2O_3$ is employed, the pressure is preferably atmoshperic so that in reality a gaseous mixture of NO and $NO_2$ in a 1:1 molar ratio is added. Even low pressures will tend to liquefy the $NO_2$ to form $N_2O_4$ which will add to the olefinic hydrocarbon charge stock to form unwanted dinitro compounds, nitro-nitrites, etc. rather than the desired nitro-nitroso dimers. On the other hand, if NO with only small amounts of $NO_2$ is used, increased reaction pressures aid in the formation of the desired dimers since an increased pressure aids in the formation of $NO_2$ from the NO in the presence of the nitro-nitroso monomers. As the amount of $NO_2$ increases in the mixture of NO and $NO_2$ which is used as the nitrosating agent to a maximum of about 1:1 molar ratio, then the maximum pressure which can be tolerated decreases in order to avoid any substantial liquefication of the $NO_2$ with the subsequent undesired formation of by-products. The optimum temperature and pressure conditions will therefore vary depending on the exact nitrosating agent but should be such that the $NO_2$ is maintained substantially entirely in the vapor phase. As a general range, the reaction pressure can vary between 0.5 and 20 atmospheres with preferred pressures depending on the nitrosating agent as noted above.

The addition of the nitrosating agent to the olefinic hydrocarbon is an exothermic reaction and care must be taken during the addition to avoid local over-heating since increased temperatures promote the solution of the dimer and consequent formation of unwanted byproducts. The local hot spots or overheating can be avoided by rapid mixing together with proper sparging of the nitrosating agent into the olefinic hydrocarbon. It is, of course, critical that the nitrosating agent be added, preferably in the gaseous state, to the olefinic hydrocarbon to better control temperature and to avoid the high stoichiometric ratios of nitrosating agent to olefin.

The reaction time depends upon the olefin conversion desired and the cooling efficiency of the reactor and is merely the time required to add the necessary amount of nitrosating agent at a rate that allows good temperature control. In general, the reaction time is between 0.5 and 10 hours or more, with the usual reaction time being between 1 and 3 hours.

The desired solid nitro-nitroso dimer can be separated from the reaction mixture by any suitable procedure. Suitable procedures include filtration and centrifugation. Distillation of the reaction mixture to remove the unreacted olefins, and diluents is not desirable unless operated under very low pressures in order to avoid heating the dimer to temperatures about 50° C.

The invention will be further illustrated with reference to the following experimental work.

In most of the experimental work, octene-1 was the olefinic hydrocarbon employed. In some runs, as noted, the octene-1 was admixed with hexane, benzene or heptane. The charge stock was added to a one-liter stirred stainless steel autoclave and the nitrosating agent was sparged through the charge stock at pressures between 0 and 100 p.s.i.g. Unless otherwise indicated, the temperature was maintained at 40° C. by internal cooling coils and by regulating the rate of addition of the nitrosating agent. The total reaction time varied between 1 and 3 hours.

After reaction, the solid dimer was separated by filtration. Analysis of the solid was by melting point, elemental analysis and infrared. In most runs, octene-1 was the olefin employed and elemental analysis showed the dimer to have the empirical formula $C_8H_{15}N_2O_3$. On melting, the dimer formed a green liquid which is characteristic of the nitro-nitroso monomer. The melting point was about 94.5° C. The infrared band spectra were the same as those published by J. F. Brown, Jr., in J.A.C.S., vol. 77, p. 6341, 1955, for an octene-1 nitro-nitroso dimer. The liquid filtrate on further cooling and standing yielded a second crop of crystal solids which analyzed the same as the first crop of solids.

Example 1

In the run for this example, the charge stock consisted of four moles of octene-1. Liquid $N_2O_3$ was vaporized to a 1:1 molar mixture of NO and $NO_2$ and this gaseous mixture was used as the nitrosating agent. The nitrosating agent was passed through a sparger and bubbled through the octene-1 held at 36° C. for a period of one hour at which time 0.66 mole of $N_2O_3$ had been added. The stoichiometric ratio of effective nitrogen oxides to olefin was 0.66:4 or 0.165. That is, $N_2O_3$ is a 1:1 molar ratio of NO to $NO_2$ and since the nitro-nitroso monomer contains 1 mole of olefin per mole of NO and $NO_2$, the stoichiometric ratio of $N_2O_3$ to olefin is the same as the mole ratio of $N_2O_3$ to olefin. The weight of dimer isolated was 89 grams. The mole percent conversion based on the $N_2O_3$ added was 16.5% (the $N_2O_3$ was completely consumed). The efficiency of the reaction to the formation of dimer based on the $N_2O_3$ consumed is 72%, i.e. 0.66 mole of $N_2O_3$ reacted with 0.66 mole of octene-1 and should yield an expected 0.66 mole of nitro-nitroso monomer or 124 grams; but only 89 grams were recovered so the efficiency is 89 divided by 124 or 72%.

Example 2

Example 1 was repeated except 0.69 mole of $N_2O_3$ were added, the reaction pressure was 50–70 p.s.i.g. and the reaction temperature was 33° C. The weight of dimer recovered was only 46 grams which reduced the efficiency of the reaction to 35%.

A comparison of Examples 1 and 2 shows the important effect of pressure when a nitrosating agent containing a large amount of $NO_2$ is employed. Under the pressure conditions of Example 2, a considerable amount of the $NO_2$ would be in the liquid phase in the form of $N_2O_4$. This undoubtedly promoted the formation of dinitro and other unwanted by-products which drastically reduced the efficiency of the reaction to the formation of the desired dimer.

Example 3

In the run for this example, the charge stock was a mixture of 2 moles of octene-1 and enough hexane so that the volume percent octene-1 in the mixture was 38%. The nitrosating agent was gaseous NO containing a small amount (about 0.02%) of $NO_2$. The reaction pressure was 100 p.s.i.g. while the reaction temperature was 40° C. The nitrosating agent was added at the rate of 1.5 moles/hr. until 3.5 moles of NO had been added. The weight of dimer isolated was 86 grams. The percent conversion based on the amount of nitrosating agent added and assuming its complete conversion was 35%. The efficiency of the reaction to the formation of dimer was 66%, again based on the amount of nitrosating agent added. The actual weight increase in the product was 43 grams and the percent conversion and efficiency based on the weight increase in product was 30% and 77%, respectively.

The stoichiometric ratio of effective nitrogen oxides to olefin in Example 3 is not the same as the mole ratio of NO to olefin since NO must be used to prepare $NO_2$ in accordance with the following equations:

(1) $\quad RCH=CH_2 + NO_2 \rightarrow R\dot{C}HCH_2NO_2$

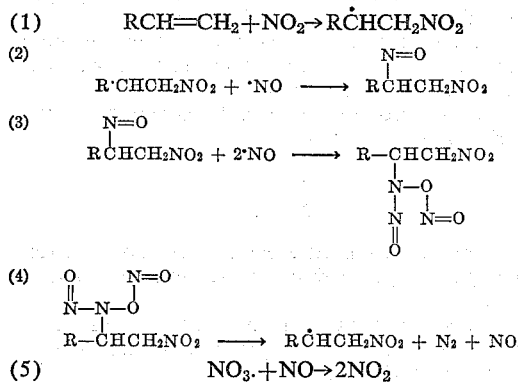

(5) $\quad NO_3 + NO \rightarrow 2NO_2$

Adding Equations 1 through 5 results in Equation 6 below.

(6) $\quad RCH=CH_2 + 4NO \rightarrow R\dot{C}HCH_2NO_2 + N_2 + NO_2$ then

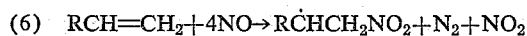

and adding 6 and 7 gives Equation 8

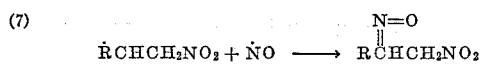

Hence, a 1:1 stoichiometric ratio of effective nitrogen oxides to olefin when using NO catalyzed with $NO_2$ is the same as a 5:1 mole ratio of NO to olefin if it is assumed the catalytic amount of $NO_2$ added initially is negligible. It can be noted from the above that effective nitrogen oxides means a 1:1 molar ratio of NO to $NO_2$.

Based on the above, the stoichiometric ratio of effective nitrogen oxides to olefin in Example 3 was 3.5/5 moles effective nitrogen oxides divided by 2 moles of olefin or 0.35. Since it is assumed all of the effective nitrosating agent is consumed, the percent conversion based on the effective nitrosating agent is 35% as noted above.

Example 4

Example 3 was repeated except benzene was used in place of hexane. The weight increase in the product was 46 grams and the weight of recovered dimer was 79 grams. The conversion and efficiency based on the nitrosating agent were 35 and 60%, respectively, while the conversion and efficiency based on the weight increase in product were 30% and 70%, respectively.

Example 5

Example 3 was repeated except 5 moles of olefin were employed and no hexane was added. The olefin was effectively being used as the solvent. The weight increase in the product was 49 grams and weight of recovered dimer was 78 grams. The percent conversion based on the nitrosating agent consumed and the weight increase was 14% and 13%, respectively. The efficiency to the formation of dimer based on the nitrosating agent and weight increase was 59% and 64%, respectively. The stoichiometric ratio of effective nitrogen oxides to olefin was 0.14.

A comparison of Examples 1 and 3 shows that $N_2O_3$ and NO catalyzed with $NO_2$ are both effective nitrosating agents.

A comparison of Examples 3, 4 and 5 shows the advantage of using a solvent such as hexane or benzene rather than excess olefin. It is believed these solvents render the reaction system more non-polar which results in a slightly higher efficiency reaction.

Example 6

Example 3 was repeated except the total moles of NO added was increased to 4.5 for a stoichiometric ratio of 0.45. The weight increase in product was 67 grams and the weight of dimer recovered was 106 grams. The percent conversion based on the nitrosating agent added and weight increase was 45 and 44, respectively, and the corresponding efficiencies were 63 and 64.

Example 7

Example 3 was repeated except the stoichiometric ratio of effective nitrogen oxides was increased to 0.60 by using only one mole of octene-1 in hexane (19% by volume olefin) and adding 3 moles of NO catalyzed with $NO_2$. The weight increase in product was 61 grams but the weight of recovered dimer was only 27 grams. The conversion based again on the nitrosating agent added and weight increase was 60 and 81%, respectively. The efficiency to dimer formation based on nitrosating agent added and weight increase was 12 and 9 percent, respectively.

A comparison of Examples 1, 3, 4, 5, 6 and 7 shows the criticality of maintaining the stoichiometric ratio of nitrosating agent to olefin below 0.5. At ratios below 0.5 (Examples 1, 3, 4 and 5) the efficiency to the formation of the desired dimer is high. At a stoichiometric ratio of 0.6 (Example 7) the efficiency drops drastically to about 10.

Example 8

Example 3 was repeated except heptane was used as the solvent, the rate of addition of NO was reduced to 1.2 moles/hour and the reaction temperature was increased to 80° C. The weight increase was 36 grams and 60 grams of dimer were isolated. The percent conversion based on the nitrosating agent and weight increase was 35 and 24, respectively, and the corresponding efficiencies were 50% and 67%, respectively.

A comparison of Examples 3 and 8 shows that an increased temperature of reaction results in a decreased efficiency of reaction to the dimer.

Example 9

Example 3 was repeated except hexene-1 was used as the olefinic hydrocarbon and a total of four moles of NO were added at a rate of 1.05 moles per hour. The stoichiometric ratio of nitrosating agent to hexene-1 was 0.45. A white crystalline solid precipitated during reaction and this solid formed a greenish liquid on melting.

Example 10

Example 3 was repeated except dodecene-1 (1.7 moles) was employed as the olefinic hydrocarbon in a 30 volume percent mixture with hexane. The recovery of solid dimer was 123 grams. The conversion and efficiency based on the nitrosating agent added were 41% and 66%, respectively.

Example 11

Example 3 was repeated except hexadecene-1 (1.3 moles) was employed as the olefinic hydrocarbon in a 47 volume percent mixture with hexane. The recovery of solid dimer was 146 grams. The conversion and efficiency based on the nitrosating agent were 43 and 91%, respectively.

Eicosene-1 was also run in a manner similar to Example 3 above and a white solid crystalline product was recovered.

Example 12

In the run for this example, 2 moles of octene-2 are admixed with 2 moles of hexane and NO containing a small amount of $NO_2$ is bubbled through at the rate of 1.5 moles per hour until 3.5 moles of NO are added. A white crystalline nitro-nitroso dimer precipitates during the reaction which is held at 40° C. and 100 p.s.i.g.

Example 13

In the run for this example, 41 grams (0.5 mole) of 1,5-hexadiene were dissolved in 800 milliliters of n-hexane. A total of 12 grams (0.16 mole) of gaseous $N_2O_3$ was added over a period of one hour. A side stream of NO was also continuously added at the rate of 0.219 cubic feet per hour. The side stream of NO was added to insure at least a 1:1 molar ratio of NO to $NO_2$. The reaction temperature was maintained at about 25°–29° C. for a reaction time of one hour, during which time a white precipitate was formed. The precipitate was filtered, washed, and had a melting point of 74°–75° C. Nuclear magnetic resonance showed the structure to be the dimer of 6-nitro-5-nitroso-1-hexene.

Example 14

In the run for this example, 50 grams (0.73 mole) of 1,4-pentadiene were dissolved in 400 milliliters of n-hexane. A total of 17 grams (0.22 mole) of gaseous $N_2O_3$ was added over a period of 1.5 hours. A total of 0.157 cubic feet of NO was added over the 1.5-hour reaction period to insure at least a 1:1 molar ratio of NO to $NO_2$. A white precipitate formed as in Example 13 indicating a dimer had formed. The reaction conditions included a temperature of 0° C. and a pressure of atmospheric.

Example 15

In the run for this example, 54 grams (one mole) of 1,3-butadiene were dissolved in 500 milliliters of carbon tetrachloride. A total of 23 grams (0.30 mole) of gaseous $N_2O_3$ was added over a reaction time of 2.25 hours at atmospheric pressure. A side stream of NO was added at the rate of 0.015 cubic feet per hour. The temperature was maintained at −6° C. to 0° C. during the run. During the reaction, a red viscous oil immiscible in the reaction medium was observed to form and float on top of the carbon tetrachloride. The red oil was separated and cooled to Dry Ice temperatures where it formed a red amorphous solid rather than the white crystalline form characteristic of the nitro-nitroso dimers of this invention.

A comparison of Examples 13–15 shows that non-conjugated diolefins, such as 1,5-hexadiene and 1,4-pentadiene form the nitro-nitroso dimers of this invention, whereas, conjugated diolefins, such as 1,3-butadiene, form an oily type product instead of the solid dimers of this invention.

Example 16

In the run for this example, 168 grams (2 moles) of cyclohexene were dissolved in 400 milliliters of n-hexane. A total of 38 grams (0.5 mole) of $N_2O_3$ were added over a period of two hours. A total of 0.26 cubic feet of NO was added over the same two-hour time period to insure at least a 1:1 molar ratio of NO to $NO_2$. The reaction conditions included a temperature between 5° and 10° C. and a pressure of atmospheric. A white crystalline product precipitated indicating a nitro-nitroso dimer was formed. The dimer was found to have a melting point of 150°–152° C.

Example 16 shows that cyclic monoolefins are also useful to form the nitro-nitroso dimers of this invention.

In all of the above examples, the conditions of reaction were such that the $NO_2$ was substantially entirely in the gaseous phase, and a white crystalline nitro-nitroso dimer precipitated during the reaction except in Example 14 where the conjugated diolefin was employed.

Resort may be had to such variations and modifications as fall within the spirit of the invention and the scope of the appended claims.

I claim:

1. A process for the production of a nitro-nitroso dimer which comprises reacting a charge stock comprising an olefinic hydrocarbon selected from the group consisting of a monoolefin and a non-conjugated diolefin with a nitrosating agent comprising a mixture of NO and $NO_2$ wherein the molar ratio of NO to $NO_2$ is at least 1:1 under conditions of temperature and pressure such that the $NO_2$ is substantially entirely in the vapor phase and wherein the stoichiometric ratio of the nitrosating agent to the olefinic hydrocarbon is less than 0.5.

2. A process according to claim 1 wherein the conditions are such that said nitro-nitroso dimer at least partially precipitates during reaction.

3. A process according to claim 1 wherein the olefinic hydrocarbon has the formula:

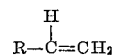

where R is selected from the group consisting of hydrogen and an aliphatic hydrocarbon having between 1 and 23 carbon atoms.

4. A process according to claim 3 wherein the nitrosating agent is selected from the group consisting of $N_2O_3$ and NO catalyzed with $NO_2$.

5. A process according to claim 4 wherein the stoichiometric ratio of the nitrosating agent to the olefinic hydrocarbon is between 0.1 and 0.35.

6. A process according to claim 5 wherein the temperature is maintained between 0° C. and the melting point of the dimer.

7. A process according to claim 5 wherein the temperature is maintained between 20° and 50° C.

8. A process according to claim 6 wherein the olefinic hydrocarbon is octene-1.

9. A process according to claim 6 wherein the charge stock comprises an olefinic hydrocarbon and a solvent selected from the group consisting of paraffins and aromatics.

10. A process according to claim 9 wherein the olefinic hydrocarbon is octene-1 and the paraffinic solvent is hexane.

11. A process according to claim 1 wherein the olefinic hydrocarbon is a non-conjugated diolefin.

12. A process according to claim 11 wherein the diolefin is 1,5-hexadiene.

13. A process according to claim 11 wherein the diolefin is 1,4-pentadiene.

14. A process according to claim 1 wherein the olefinic hydrocarbon is cyclohexene.

(References on following page)

References Cited

UNITED STATES PATENTS

| | | | |
|---|---|---|---|
| 3,340,314 | 9/1967 | Blackley | 260—467 |
| 3,341,511 | 9/1967 | Tanaka et al. | 260—143 |
| 2,621,205 | 12/1952 | Doumani et al. | 260—647 X |
| 3,175,011 | 3/1965 | Motz et al. | 260—647 |
| 3,205,273 | 9/1965 | Flanagan | 260—647 |

OTHER REFERENCES

Emmons, J. Am. Chem. Soc., vol. 79, pp. 6522 to 6524 (1957).

L. DEWAYNE RUTLEDGE, *Primary Examiner.*

CARL D. QUARFORTH, *Examiner.*

L. A. SEBASTIAN, *Assistant Examiner.*